United States Patent
Christian et al.

(10) Patent No.: US 9,196,939 B2
(45) Date of Patent: Nov. 24, 2015

(54) METHOD FOR THERMAL MANAGEMENT AND MITIGATION OF THERMAL PROPAGATION FOR BATTERIES USING A GRAPHENE COATED POLYMER BARRIER SUBSTRATE

(75) Inventors: Benjamin R. Christian, Novi, MI (US); Chih-Cheng Hsu, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 601 days.

(21) Appl. No.: 13/287,271

(22) Filed: Nov. 2, 2011

(65) Prior Publication Data

US 2013/0108897 A1     May 2, 2013

(51) Int. Cl.
| | |
|---|---|
| *H01M 10/50* | (2006.01) |
| *H01M 10/613* | (2014.01) |
| *H01M 10/625* | (2014.01) |
| *H01M 10/647* | (2014.01) |
| *H01M 10/6555* | (2014.01) |

(52) U.S. Cl.
CPC .......... *H01M 10/613* (2015.04); *H01M 10/625* (2015.04); *H01M 10/647* (2015.04); *H01M 10/6555* (2015.04)

(58) Field of Classification Search
None
See application file for complete search history.

(56) References Cited

U.S. PATENT DOCUMENTS

| | | | |
|---|---|---|---|
| 2009/0053585 A1* | 2/2009 | Nakazawa | 429/56 |
| 2010/0021708 A1* | 1/2010 | Kong et al. | 428/220 |

FOREIGN PATENT DOCUMENTS

| | | | |
|---|---|---|---|
| CN | 101809762 A | | 8/2010 |
| EP | 2197041 | * | 6/2010 |

* cited by examiner

*Primary Examiner* — Ladan Mohaddes

(74) *Attorney, Agent, or Firm* — Dinsmore & Shohl LLP

(57) ABSTRACT

An automotive battery module with one or more battery cells and a heat exchange member placed in thermal communication with the battery cell. Heat generated within the battery cell by, among other things, electric current that can be used to provide motive power for the automobile may be removed by the heat exchange member that is made up of a flexible substrate and one or more graphene layers disposed on the substrate. The construction of the substrate and graphene layer is such that multiple heat transfer paths are established, each defining different levels of thermal conductivity and related transfer of heat away from the battery cells.

6 Claims, 3 Drawing Sheets

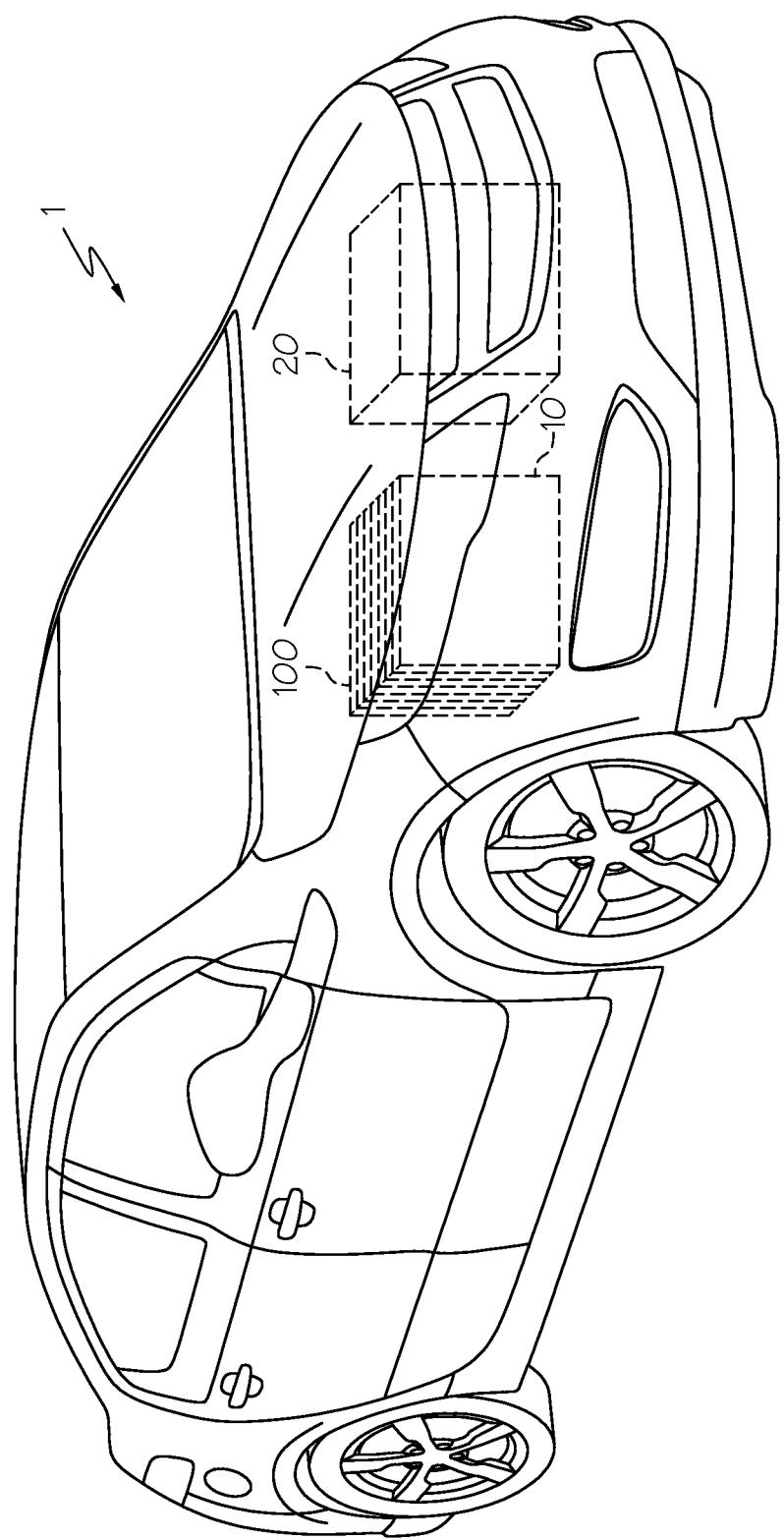

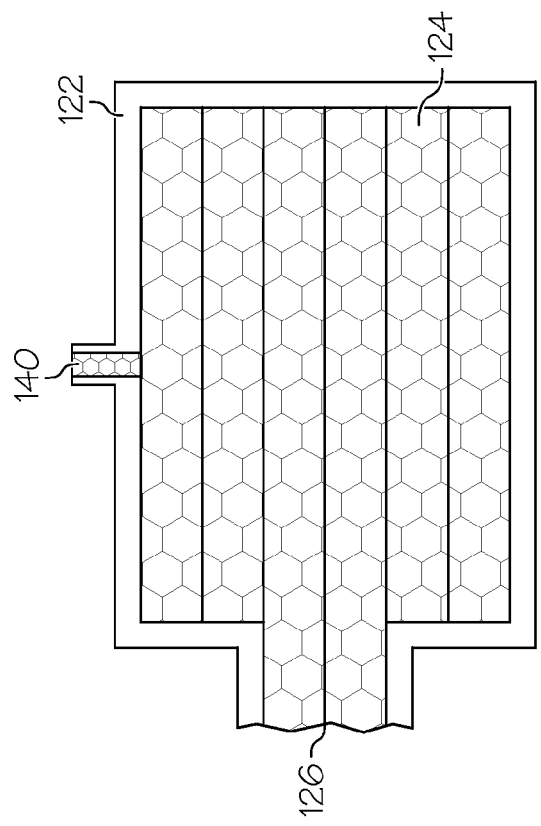
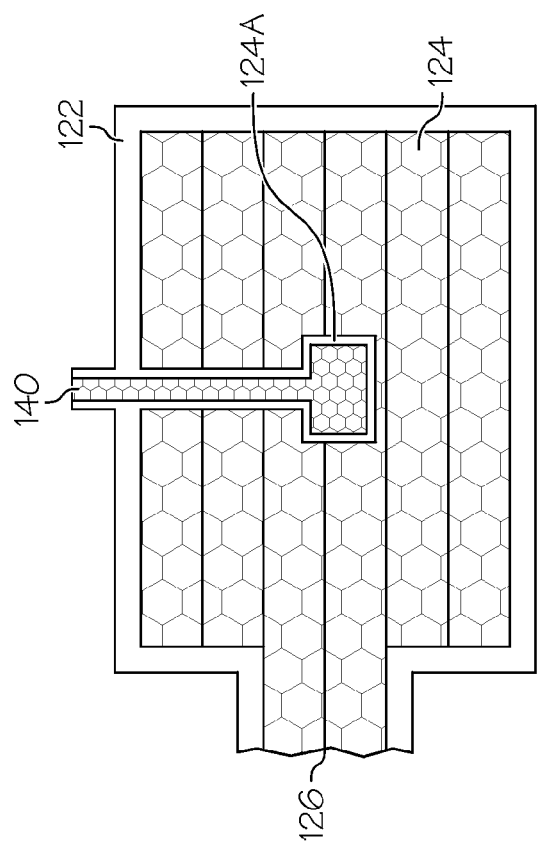

METHOD FOR THERMAL MANAGEMENT AND MITIGATION OF THERMAL PROPAGATION FOR BATTERIES USING A GRAPHENE COATED POLYMER BARRIER SUBSTRATE

BACKGROUND OF THE INVENTION

This invention relates generally to the use of graphene-coated substrates for passive or active thermal management systems for batteries and portions thereof, and in particular to the use of aligned graphene-coated polymer substrates for mitigation of thermal propagation to neighboring battery cells during abuse conditions.

Lithium-ion and related batteries, collectively known as a rechargeable energy storage system (RESS), are being used in automotive applications as a way to supplement, in the case of hybrid electric vehicles (HEVs), or supplant, in the case of purely electric vehicles (EVs), conventional internal combustion engines (ICEs). The ability to passively store energy from stationary and portable sources, as well as from recaptured kinetic energy provided by the vehicle and its components, makes batteries ideal to serve as part of a propulsion system for cars, trucks, buses, motorcycles and related vehicular platforms. In the present context, a cell is a single electrochemical unit, whereas a battery is made up of one or more cells joined in series, parallel or both, depending on desired output voltage and capacity.

Temperature is one of the most significant factors impacting both the performance and life of a battery. Environmental temperatures (such as those encountered during protracted periods of inactivity in cold or hot environments, or due to extended periods of operation and concomitant heat generation on hot days) or abuse conditions (such as the rapid charge/discharge, or internal/external shorts caused by the physical deformation, penetration, or manufacturing defects of the cells) can negatively impact the ability of the battery to operate correctly, and in severe cases can destroy the battery entirely. Side effects of prolonged exposure to high temperature may include premature aging and accelerated capacity fade, both of which are undesirable.

Excess heat can be provided by an external source or by the internal failure of a battery cell caused by physical, thermal, or operational abuse conditions outside the recommended tolerances, as well as by manufacturing defects. An onset temperature is that temperature at which an exothermic reaction occurs. The heat required to maintain such an exothermic reaction is known as the heat of reaction, while a heat source that exceeds the onset temperature and maintains the heat of reaction is a thermal event. Such thermal events, if left uncontrolled, could potentially lead to a more accelerated heat generation condition, referred to herein as thermal runaway, a condition where (once initiated) the cooling mechanism is incapable of returning one or more of the battery components to a safe operating temperature. In the present context, a thermal runaway is a function of the self-heating rate of the exothermic reaction and the temperature, and the time of the reaction is a function of the rate of degradation and the mass of active components taking part in such reaction. Of particular concern is the possibility for excess heating of, and concomitant damage to, a battery cell, pack or related member being used as a source of propulsive power. Conventional heat transfer methods such as forced air and liquid cooling, whether as a primary or backup system, may prove to be effective at avoiding such excessive heat exposure during such a thermal event, but do so by significant additions to overall vehicular system weight, cost, complexity or parasitic power requirements.

SUMMARY OF THE INVENTION

A battery thermal management system based on the use of a heat transfer material or materials in a heat exchange member can help maintain optimal operating temperatures and temperature uniformity of a battery under normal operating conditions, as well as minimize heat transfer generated by a thermal event to neighboring cells during abuse conditions. In both circumstances, this helps to mitigate thermal propagation and the related potential to damage additional components.

According to one aspect of the invention, a thermal management system for a battery (or battery module) is disclosed. The battery includes one or more battery cells configured to deliver electric current. The thermal management system includes a heat exchange member placed in thermal communication with the one or more battery cells. The heat exchange member is made up of a flexible substrate with one or more graphene layers disposed on the substrate. In a most simplistic embodiment, the battery may be configured as a single cell and a single heat exchange member, while in a more comprehensive embodiment, may include a plurality of both cells and members stacked relative to one another; the number of each will be appreciated by those skilled in the art to coincide with the power needs of the device receiving electric current from the module and the thermal operating requirements of the cell or battery.

The present inventors have discovered that graphene, with known anisotropic thermal conductivities of up to 1400 W/m-K in-plane and 10 W/m-K through-plane, coated onto a flexible polymeric substrate, are ideal for both thermal management of a battery and the mitigation of thermal energy to neighboring cells and components when used in a battery module. Graphene is a one-atom-thick planar sheet of covalently-bonded carbon atoms arranged in a hexagonal or honeycomb-shaped crystal lattice with a thickness of 0.335 nanometers per layer. Deposition of multiple layers of graphene aligned in-plane provides an ideal mode for heat transfer for high volumetric and gravimetric energy density applications, as it is desirable to keep the total stack height of a battery module as small as possible. Placing aligned graphene layers on a polymer substrate in thermal communication with the cells within a battery provides a flexible pathway to a heat source or sink, while the flexible substrate may be more particularly configured as a compressible medium. Such compressible nature allows for compensation of cell thermal expansion, as well as an additional source of thermal insulation in the through-plane direction.

As discussed above, battery packs are made up of numerous battery modules each of which is in turn made up of one or more battery cells that deliver electrical current to a load. One such non-limiting example of a load includes the equipment used to provide motive power to the powertrain of an automobile, as well as auxiliary applications associated with operating the vehicle. In the present context, the term "motive power" describes a battery pack capable of providing more than mere starting power for another power source (such as an internal combustion engine); it includes battery packs capable of providing sustained power sufficient to propel a vehicle in a manner consistent with that for which it was designed. It will be appreciated by those skilled in the art that such batteries may also store energy recaptured from kinetic energy, such as regenerative braking or excess energy from an ICE. In one form, the current generated by the battery pack may be used to run one or more electric motors that in turn may be used to turn one or more wheels. Other members (for example, structural members) are placed in thermal communication with the battery cell to enable heat exchange between them. The charge and discharge (or cycling) of the battery, the internal resistance of the cell, and the conductivity of associated electrical pathways are the primary sources of thermal energy in the battery. In a preferred form, the heat exchange within the battery occurs through passive means; as such, significant amounts of heat generated by, or otherwise present around, the individual battery cells can be achieved without (or at least a significant reduction in) the need for supplemental cooling, such as forced-air or forced-liquid convective cooling which create additional parasitic losses in the battery system that impact its overall efficiency. Heat generated during the cycling and the optimal operating temperatures for the cell and battery are electrochemically dependent, and the temperature limit is dictated only by the maximum temperature of the polymer used as the substrate.

Optionally, the heat exchange member and the one or more battery cells define a substantially planar construction; such construction (where both the cells and the members have a plate-like structure) allows them to be stacked against one another (like a deck of cards) such that an adjacently-facing relation exists between them. This maximizes surface area contact between the heat-generating cells and the heat-receiving members, where the latter act as cooling plates. In a more detailed form, the relatively flat cooling plates are constructed to take advantage of the directional nature of the thermal conductivity of the graphene layer or layers, where the thermal conductivity (and concomitant heat flow) along the in-plane direction of the graphene, which substantially coincides with the planar dimension of the substrate to which it is attached, is significantly higher than along the thickness (i.e., through-the-thickness) direction of the layer. Such differences are consistent with the crystal orientation of the graphene layer, as will be understood by those skilled in the art. In the present context, the in-plane dimension of the heat transfer proceeds along the dimension formed by the aforementioned hexagonal crystal structure of the graphene layer. In configurations where the substrates and attached graphene layers aren't truly planar (such as in the case of a slightly convex or concave substrate, for example), this in-plane dimension is still present so long as the differences in thermal conductivity through-the-thickness and along the crystal orientation of the graphene layer are significant. As such, a slightly convex, concave or related curvilinear structure for the heat exchange member is deemed to be within the scope of the present invention.

As stated above, the substrate is preferably of a flexible nature; such configuration allows the placed or deposited graphene (which is thin relative to the substrate) to mimic the flexible substrate, which in turn allows the aligned graphene to be conformed to any shape desired to be in thermal communication with the cells and heat sink or heat source, where the only significant limit to the shape is if the monolayer of graphene were to be broken (due to such things as sharp edges and corners), as the breaking of the thermal pathway (also referred to herein as thermal flowpath) would greatly reduce the thermal conductivity of the apparatus.

In additional options, the thermal conductivity along an in-plane dimension of the at least one graphene layer is at least about 1000 W/m-K and the thermal conductivity along its thickness dimension is less than about 100 W/m-K. In a more particular form, the in-plane thermal conductivity is at least about 1400 W/m-K and the thermal conductivity through its thickness is less than about 10 W/m-K. As mentioned above, in a particular form, the substrate is made from a polymeric material; such materials, in addition to being relatively inexpensive to manufacture, are structurally robust enough to support the graphene layer in a battery environment, and possessive of a relatively low thermal conductivity. Such low thermal conductivity is beneficial in that it enhances the thermal tailoring already made possible by the inherent properties of the graphene layer. For example, in situations where it is desirable to minimize thermal communication between adjacent cells, a cooling plate or related heat transfer member placed between them that includes a low thermal conductivity substrate will be more resistant to heat transfer through the cooling plate from one cell to the other than if the substrate were made from a high thermal conductivity material. This may work in conjunction with the graphene layer deposited on the substrate, as the through-the-thickness dimension of the layer is already possessive of a much lower thermal conductivity than that of the in-plane dimension. Having to flow through two mediums of the heat exchange member, each of relatively low thermal conductivity in at least the through-the-thickness direction, will further contribute to increased thermal isolation between adjacent cells. Yet another optional feature is to use the high in-plane thermal conductivity of the aligned graphene as a thermal pathway to a thermal measurement device such as a thermocouple, thermistor or the like. In this way, the uniformity of the temperature of a cell in thermal communication with the graphene can be readily determined. Such a thermal measurement device could then be calibrated according to any thermal losses associated with the system in between the source and point of measurement. The thermal measurement device may be calibrated to account for any thermal losses associated with the battery pack between the heat source and a remote point of measurement. Furthermore, the measurement device may be used to determine the overall temperature of the cell area, or a specific location of interest on the cell such as the tabs or an area of greatest current density.

According to another aspect of the invention, a propulsion system for an automobile is disclosed. The propulsion system includes one or more battery modules each of which is made up of one or more battery cells where an electrochemical reaction takes place, as well as a heat exchange member placed in thermal communication with the battery cell or cells. The heat exchange member includes a flexible substrate and at least one graphene layer disposed on the flexible substrate. As discussed above, the graphene layer functions as a heat transfer material with directional thermal conductivity properties. Thus, heat trying to flow through one dimension of the material may be expected to encounter a greater or lesser degree of thermal resistance than through another dimension. In a conventional Cartesean coordinate (i.e., x-y-z) system, these dimensions may correspond to linear axes or directions, such as an in-plane direction (which may embody, for example, a plane defined by the y-z axes) as well as a through-the-thickness direction (which may coincide with a linear dimension along the x-axis stacking direction of one or more battery modules).

Optionally, the heat exchange member is configured such that the first heat transfer path proceeds substantially along an in-plane dimension of the graphene layer and the second heat transfer path proceeds substantially along a thickness dimension of the graphene layer. In one form, the thermal conductivity of the first heat transfer path is greater than but not limited to 1000 W/m-K, while that of the second heat transfer path is less than about 100 W/m-K. In a more particular form, these values may be at least about 1400 W/m-K and less than about 10 W/m-K, respectively. In another particular form, a heat sink may be placed in thermal communication with at least the first heat transfer path. It will be appreciated by those skilled in the art that certain portions of the automobile are conventional, such as a chassis, wheels, and related control mechanisms, while particular features, such as the body, may be configured to hold a driver or related operator, passengers or cargo, as well as serve as a compartment for any or all of the above. When configured as a passenger vehicle, such body may also include windows, doors, seats, passenger compartment, creature comfort features or other advantageous components. As stated above, the propulsion system, which is for providing motive power to the automobile, may come either solely from one or more battery packs, or may involve a hybrid architecture, where battery packs working in conjunction with an ICE are employed.

According to yet another aspect of the invention, a method of controlling temperature in an automobile propulsion system is disclosed. The method includes configuring the propulsion system to derive at least a portion of its motive power from one or more battery cells (which may in turn make up the successively larger units of a battery module and a battery pack), arranging a heat exchange member to be in thermal communication with the battery cell, and transferring at least a portion of the heat contained within the at least one battery cell to the heat exchange member. The heat exchange member includes a flexible substrate and one or more graphene layers disposed on the substrate such that said heat exchange member provides a first thermal flowpath and a second thermal flowpath where the first thermal flowpath is possessive of a significantly higher thermal conductivity than the second thermal flowpath. In a variation on this aspect, a method of assembling a passive heat exchange member by placing, affixing or otherwise coupling a graphene layer to a flexible substrate (such as a flexible polymeric-based substrate) is also disclosed.

In one optional form, the first thermal flowpath substantially coincides with an in-plane dimension of a heat transfer member that is disposed adjacent one or more battery cells. In a more particular form, the heat exchange member is made up of a substrate and one or more graphene layers that are placed on or otherwise secured to the substrate such that it is mounted to it. In another form, an in-plane dimension of the graphene layer is substantially coincident with the first thermal flowpath, while a thickness dimension of the graphene layer is substantially coincident with the second thermal flowpath. In a more particular form, each of the battery cells and heat exchange members define a substantially planar shape. As with the previous aspects, the thermal conductivity corresponding to the first thermal flowpath is very high, for example, at least about 1000 W/m-K, while that of the second thermal flowpath is less relatively low, for example, less than about 100 W/m-K. In a particular aspect, the first thermal flowpath may be placed in thermal communication with a dedicated heat sink. In the present context, a dedicated heat sink is configured to be at least mostly for the removal of heat generated along the first thermal flowpath. Thus, in situations where the in-plane direction of the graphene layer forms the first thermal flowpath, the thermal connection between the graphene layer and the heat sink forms a dedicated relationship, even if the heat sink may perform other heat exchange functions, such as subsequently exchanging heat with the ambient environment.

BRIEF DESCRIPTION OF THE DRAWINGS

The following detailed description of the preferred embodiments of the present invention can be best understood when read in conjunction with the following drawings, where like structure is indicated with like reference numerals and in which:

FIG. 1 shows a vehicle with a hybrid propulsion system in the form of a battery pack and an internal combustion engine;

FIG. 4A shows a device for measurement of a specific location of an adjacent battery cell using aligned graphene and a thermal flowpath that can later be calibrated based on the heat losses associated with a specific application; and FIG. 4B shows a device for measurement of the substantial entirety of an area of an adjacent battery cell using aligned graphene and a thermal flow path that can later be calibrated based on the heat losses associated with a specific application.

DETAILED DESCRIPTION OF THE PREFERRED EMBODIMENTS

Referring first to FIG. 1, a vehicle 1 includes a hybrid propulsion system in the form of a battery pack 10 and a conventional ICE 20. As mentioned above, such a vehicle is known as an HEV. Battery pack 10 employs numerous battery modules 100 that are typically arranged in a repeating array as shown. In one typical example, battery pack 10 may include about two hundred individual battery cells (to be discussed in more detail below), although it will be appreciated by those skilled in the art that additional or fewer cells may be needed, depending on the power required. It will be further appreciated by those skilled in the art that vehicle 1 may not require an ICE 20; in such case, rather than being an HEV, it is an EV; either form is within the scope of the present invention.

Figure 2:
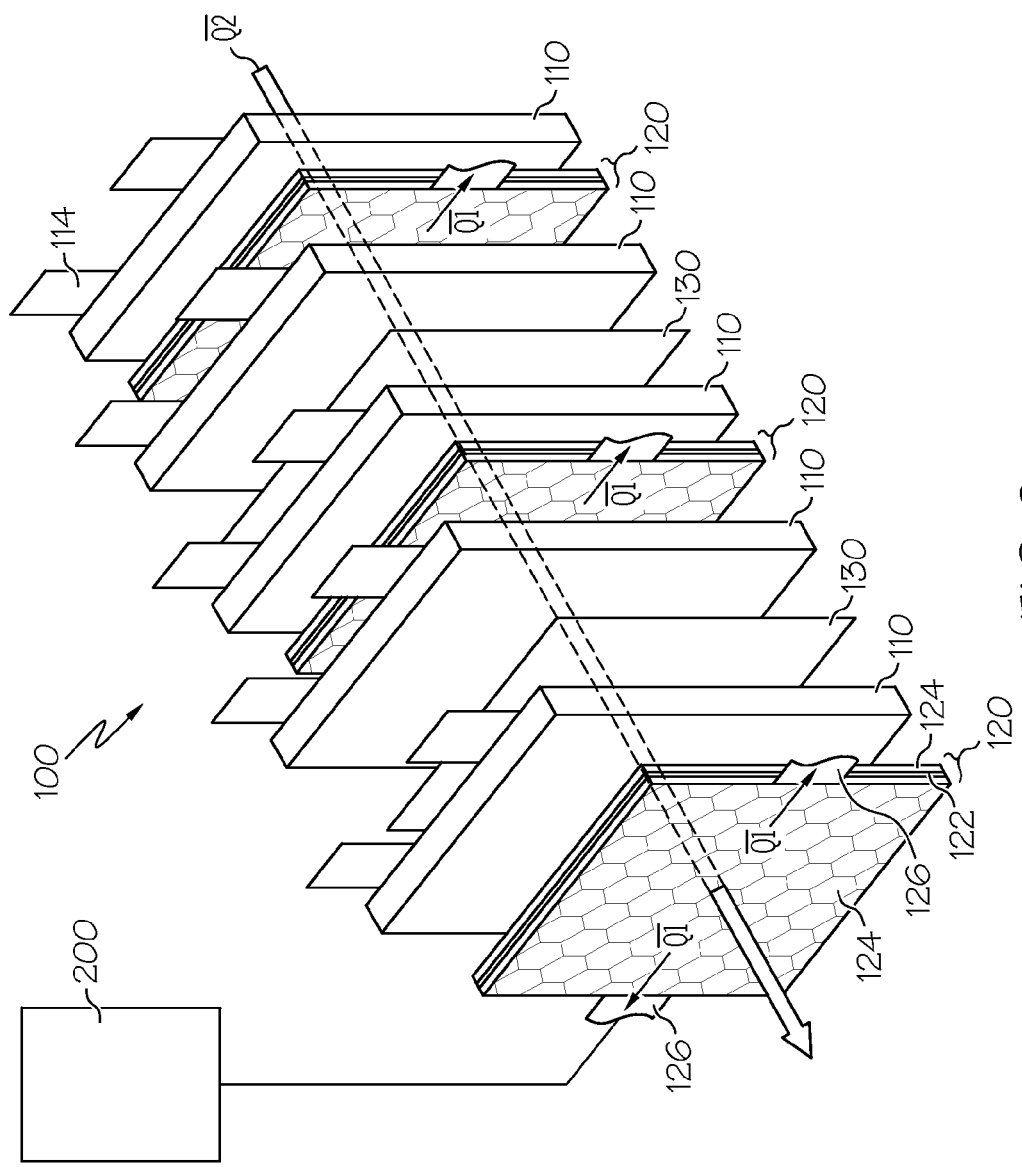
FIG. 2 is a simplified exploded view of a battery module that makes up the battery pack of FIG. 1, where the module includes passive thermal management.

Referring next to FIG. 2, an exploded view depicting significant portions of a battery module 100 with predominant heat flow directions Q1 and Q2, as well as thermal propagation mitigation features, is shown. It will be appreciated by those skilled in the art that other battery components necessary for operation are not shown in order to better emphasize such thermal propagation mitigation features. Examples of such presently-omitted components include frames and related structure, cooling plates and fins, insulative sheets, temperature-sensing equipment or the like. In order to form the module 100, at least some of the components discussed herein may be arranged in a repeating stack-like manner. For example, numerous battery cells 110 may be interspersed among numerous cooling plates 120. Battery cells 110 include tab-like electrodes 114 through which electric current generated within each of the cells 110 may flow to a load or related workpiece such as wheels, electric motors or the like. As shown, the cells 110 define a relatively thin rectangular-shaped structure such that the generally planar surfaces substantially maximize exposed surface area. Optional flexible film heater 130 may be interspersed between the battery cells 110 and cooling plates 120 as a way to provide an additional active heating, as well as function as an additional thermal barrier against through-the-thickness heat flow Q2, as well as a way to connect to an optional active heating source (not shown) for use in cold weather starting or related low-temperature situations. In one form, flexible film heater 130 may be a Kapton flexible material that can be connected to s suitable heating device. The flexible nature of the substrate 122 (as well as the graphene layer 124 disposed on or otherwise coupled to substrate 122) helps promote ease of assembly, especially when coupled to a non-planar or related irregular surface. Likewise, conveying heat to or from the various battery cells 110 is preferably through a thermal pathway 126 that is in thermal communication with heat sink 200. The highly anisotropic thermal behavior of the graphene layers 124 allows them to form thin members for adjacent battery cells or other components that are in need of volumetrically-efficient heat exchange capability. The high in-plane thermal conductivity can, when extended to the thermal pathway 126, provide a convenient path for the flow of heat between the adjacent battery cell or cells 110 and the heat sink 200.

Figure 3:
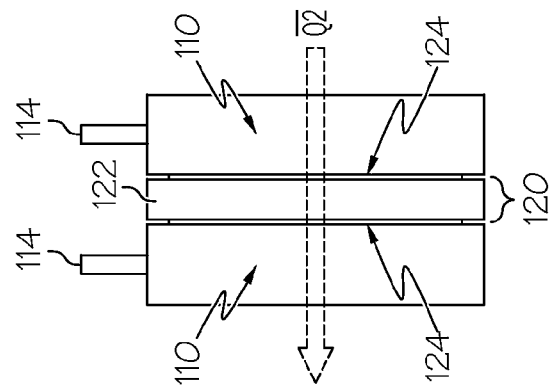
FIG. 3 shows, in simplified form, a representative stacking arrangement between a pair of battery cells and a heat transfer member according to an aspect of the present invention.

Referring next to FIG. 3 in conjunction with FIG. 2, cooling plates 120 are sized and shaped to have approximately the same outer dimensions as those of the cells 110. In this way, the module 100 and battery pack 10 made up of the stacked cells 110 and plates 120 may be formed into a relatively compact geometrical shape, such as a cube. In a particular form, the cooling plates 120 are made up of a layered assembly of a generally planar polymeric substrate 122 onto which one or more layers of oriented graphene layers 124 are placed or deposited. In a preferred form, the substrate 122 has both the structural rigidity and relatively low through-the-thickness thermal conductivity needed such that upon being placed against adjacent cells 110 can function as both a carrier for the graphene layers 124 as well as a thermal barrier against cell-to-cell heat transfer. Examples of suitable polymeric substrates 122, such as polyethylene terephthalate (PET), polyethylene (PE) and nylon, have very low thermal conductivity (less than 1 W/m) which has the effect of lowering the overall system through-plane thermal conductivity. By placing the graphene layer 124 on a flexible polymer substrate 122, the aligned graphene layer 124 can be conformed to any shape desired to be placed in thermal communication with one or more of the cells 110 and a heat sink (or source, as needed) 200, limited only by the minimum bending radius of the monolayer structure of the graphene layer 124 needed to avoid breakage of the in-plane thermal pathway. As shown, the graphene layer 124 may be placed on both sides of substrate 122 (as shown) or on a single side, depending on the cooling or heating needs. It will likewise be appreciated by those skilled in the art that the bidirectional nature of the flow of heat between the battery module 100 and heat sink 200 through thermal pathway 126 means that the heat sink 200 may also be configured as a heat source; the nature of it operating as a source or sink will be apparent from the context. Substrate 122, by virtue of being constructed of relatively low thermal conductivity material such as those discussed above, helps to limit thermal interaction between neighboring cells 110. In addition, substrate 122 may be made as a compressible medium; such structure permits the module 100 to compensate for thermal expansion or contraction through the thickness of the stacked cells 110 of module 110.

Cooling plates 120 are interspersed among the cells 110 in a sandwich-like fashion. In this way, both the through-the-thickness low thermal conductivity (represented by the through-the-thickness heat flow Q2) and the high edgewise thermal conductivity (represented by the edgewise heat flow Q1, shown notionally as passing through the thermal pathway 126 on the way to or from heat sink 200, where such depictions may be understood to flow edgewise in both directions) can be employed to provide desirable thermal management properties during both normal operating conditions of battery pack 10, as well as in situations where one or more cells 110 might be in danger of thermal runaway. The relatively high thermal conductivity heat paths through the edges of graphene layers 124 (i.e., along the plane of the graphene layer's hexagonal crystal structure) may be routed to the remote heat sink 200, as shown by the representative connectivity between the leftmost cooling plate 120 and the heat sink 200 of FIG. 2. It will be appreciated by those skilled in the art that the simplified representation of FIGS. 2 and 3 do not show some redundant details of all the thermal pathways 126 (such as the aforementioned connectivity to the heat sink 200); nevertheless, such redundant features will be understood to be present in a manner generally similar to those shown. In one form, the thermal pathways 126 may be configured as heater films to provide the necessary heating in low-temperature environments where starting and operating a battery can be particularly harsh on battery life. In one form, these flexible heater films may be made from DuPont's Kapton™ Likewise, the thermal pathways may be made from a flexible material in a manner similar to that of substrate 122.

Referring next to FIGS. 4A and 4B, other equipment, such as thermistors 140 or related sensors may be situated between the various components to monitor battery cell 110 temperature. In one preferred form, the thermistors 140 are also be made from the aligned graphene material. As shown with particularity in FIG. 4A, thermistor 140 may be deposited on a specific sensing location (such as a place of known or suspected high electric current density) of the graphene layer 124, or in patterns along the substrate 122 to reduce the overall required amount of graphene for an application. To prevent inadvertent thermal cross-talk between the graphene layer 124 and the thermistor 140, a small gap 124A is formed between them. As shown with particularity in FIG. 4B, a substantial entirety of a substrate 122 surface can be covered with a graphene layer 124 in a manner generally similar to that of FIG. 2. In such case, the thermistor 140 merely contacts the surface of the graphene layer 124 at a convenient peripheral location.

Other passive devices may be used in conjunction with the cooling plates 120 of the present invention. For example, heat pipes (not shown) may also be employed, especially in situations where thermal runaway of one or more cells 110 may be of concern. An example of the use of such heat pipes may be found in co-pending U.S. patent application Ser. No. 13/299,886 entitled METHOD FOR MITIGATING THERMAL PROPAGATION OF BATTERIES USING HEAT PIPES and filed on Nov. 18, 2011, which is owned by the Assignee of the present invention and hereby incorporated in its entirety by reference.

To achieve a desirable balance between battery life and performance, the present inventors have determined that only small temperature variations between the modules 100 of the pack 10 be permitted. Based on current battery state-of-the-art, such module-to-module differences should be kept to no more than about 5° C. Furthermore, the present inventors have determined that certain types of batteries, such as Li-Ion batteries, operate best at temperatures between 25° C. and 40° C. The cooling plates 120 (in conjunction with heat sink 200) can be designed for a specific operating temperature that satisfies the optimum battery cell 110; likewise, the extremely high thermal conductivity of the graphene layers 124 helps promote rapid, highly effective heat transfer values that are useful in maintaining a relatively constant temperature distribution across the cells 110.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, terms such as "substantially" are utilized to represent the inherent degree of uncertainty that may be attributed to any quantitative comparison, value, measurement, or other representation. It is also utilized to represent the degree by which a quantitative representation may vary from a stated reference without resulting in a change in the basic function of the subject matter at issue.

For the purposes of describing and defining the present invention it is noted that the term "device" is utilized herein to represent a combination of components and individual components, regardless of whether the components are combined with other components. For example, a device according to the present invention may comprise a source of motive power, a vehicle incorporating the source of motive power or other equipment that may make up, or be used in conjunction with, the vehicle or source of motive power. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A thermal management system for a plurality of batteries aligned along a common stacking axis, said thermal management system comprising at least one heat exchange member, wherein each of said at least one heat exchange member is placed in thermal communication between two adjacent batteries of said plurality of batteries and each of said at least one heat exchange member comprises a polymeric flexible substrate and at least one graphene layer disposed thereon such that said polymeric flexible substrate functions as a thermal barrier between said adjacent batteries aligned along said stacking axis such that a majority of heat being conveyed from said adjacent batteries to an external heat sink passes through an in-plane direction formed within said at least one graphene layer.

2. The thermal management system of claim 1, wherein said heat exchange member and said adjacent batteries comprise a substantially planar construction such that an adjacently-facing relation is formed between them.

3. The thermal management system of claim 1, wherein the thermal conductivity along an in-plane dimension of said heat exchange member is at least about 1000 W/m-K and said thermal conductivity along its thickness dimension is less than about 100 W/m-K.

4. The thermal management system of claim 3, wherein the thermal conductivity along an in-plane dimension of said heat exchange member is at least about 1400 W/m-K and said thermal conductivity along its thickness dimension is less than about 10 W/m-K.

5. The thermal management system of claim 1, further comprising a thermal pathway coupled to said heat exchange member to facilitate the conveyance of said majority of heat to said external heat sink.

6. The thermal management system of claim 5, further comprising a thermal measurement device in signal communication with said heat exchange member.

* * * * *